United States Patent
Parkinson et al.

(10) Patent No.: US 6,659,780 B2
(45) Date of Patent: Dec. 9, 2003

(54) UNDERWATER CONNECTOR WITH ELECTRICAL STRESS REDUCTION

(75) Inventors: Stuart L. Parkinson, Ulverston (GB); Michael C. Marklove, Dalton-in-Furness (GB)

(73) Assignee: Tronic Limited, Cumbria (GB)

( * ) Notice: Subject to any disclaimer, the term of this patent is extended or adjusted under 35 U.S.C. 154(b) by 0 days.

(21) Appl. No.: 09/833,939

(22) Filed: Apr. 12, 2001

(65) Prior Publication Data

US 2002/0016097 A1 Feb. 7, 2002

Related U.S. Application Data

(60) Provisional application No. 60/200,434, filed on Apr. 28, 2000.

(30) Foreign Application Priority Data

Apr. 14, 2000 (GB) .............................. 0009351

(51) Int. Cl.⁷ ............................ H01R 4/58; H01R 13/52
(52) U.S. Cl. ......................................... 439/89; 439/271
(58) Field of Search ............................... 439/89, 88, 271, 439/273, 274, 201; 385/99, 107

(56) References Cited

U.S. PATENT DOCUMENTS

| | | | |
|---|---|---|---|
| 4,204,740 A | * | 5/1980 | Krolak ...................... 439/316 |
| 4,606,603 A | * | 8/1986 | Cairns ..................... 350/96.21 |
| 4,808,127 A | * | 2/1989 | Swanic ....................... 439/139 |
| 5,407,363 A | * | 4/1995 | Polgar et al. ............... 439/546 |

FOREIGN PATENT DOCUMENTS

| DE | 0 491 091 A1 | 12/1990 | |
|---|---|---|---|
| GB | 2 192 316 | * 1/1988 | .......... H02G/15/14 |

* cited by examiner

*Primary Examiner*—Chandrika Prasad
(74) *Attorney, Agent, or Firm*—Alix, Yale & Ristas, LLP

(57) ABSTRACT

A connector for making an electrical connection underwater or in a wet environment, comprising first and second connector parts for engagement with each other to establish the electrical connection, the first connector part having a connecting pin provided with an insulating layer around a conductive core leading to a first electrical contact portion, the second connector part having a second electrical contact portion for engagement by the first electrical contact portion, and the second connector part having a seal arranged so that in the mated condition of the connector the connecting pin extends forwardly through an opening in the seal, the first electrical contact portion then making contact with the second electrical contact portion, wherein an earthing conductive layer is provided around the insulating layer for reducing electrical stress at the seal when the connecting pin passes therethrough.

22 Claims, 7 Drawing Sheets

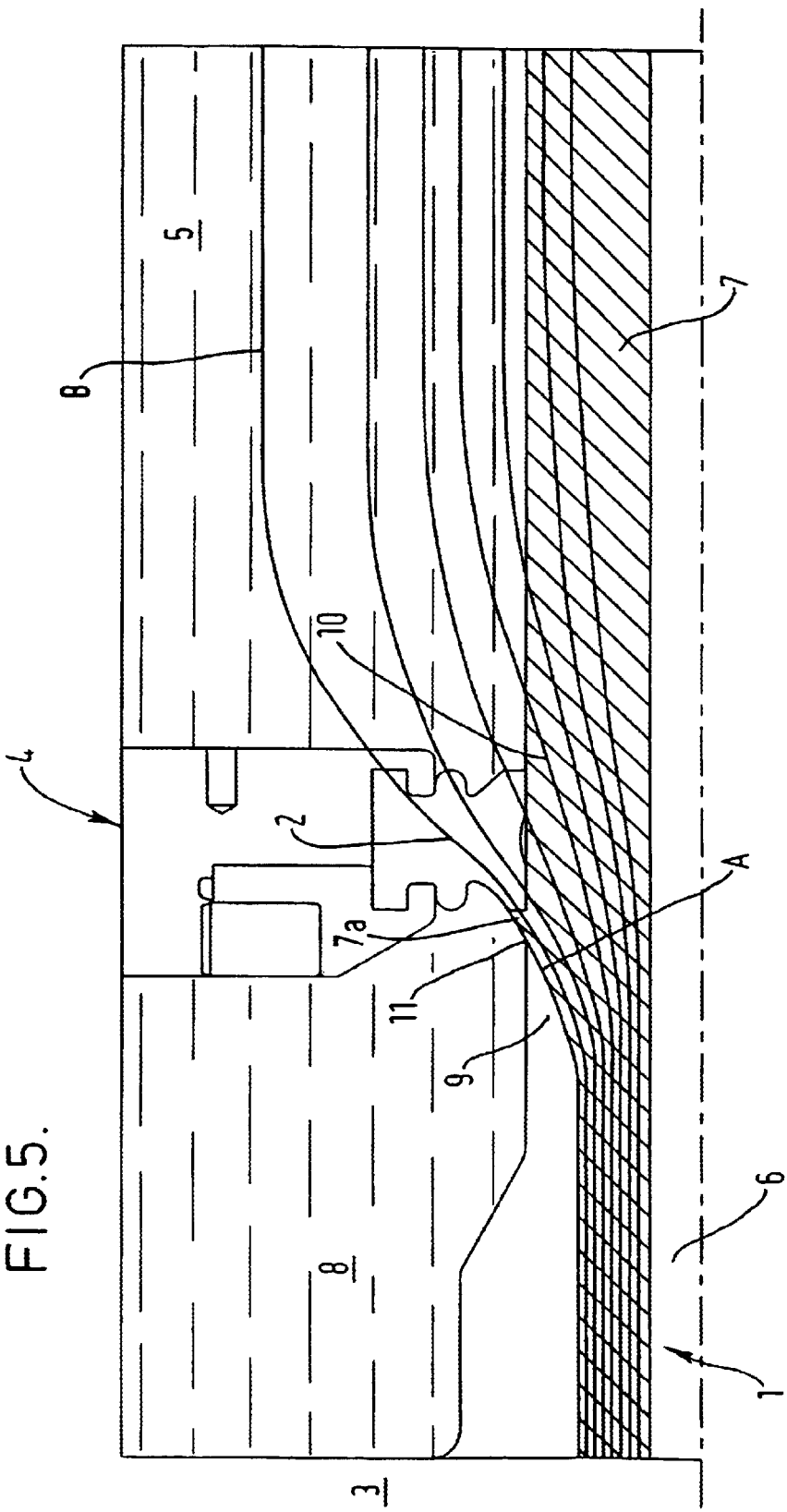

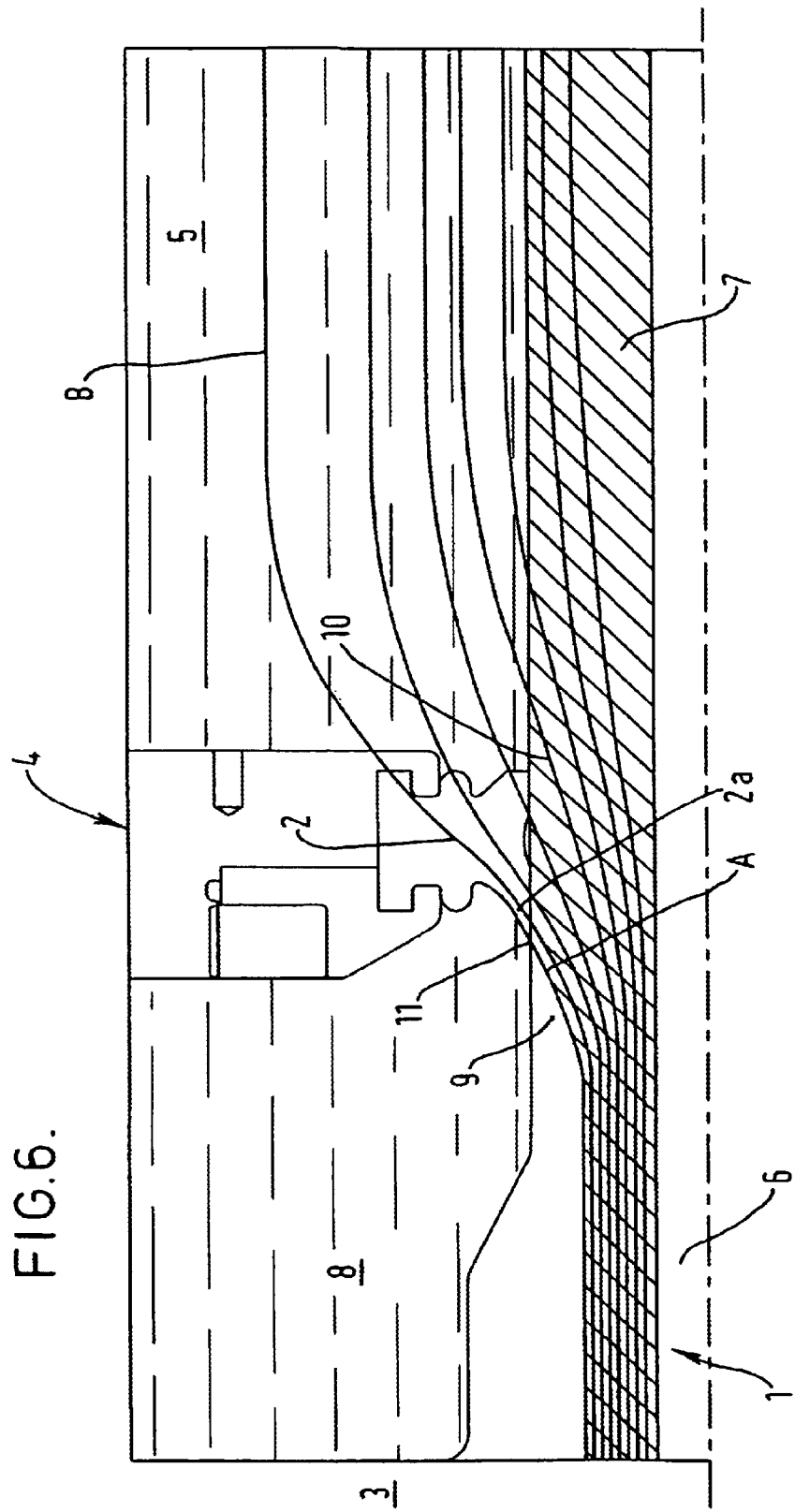

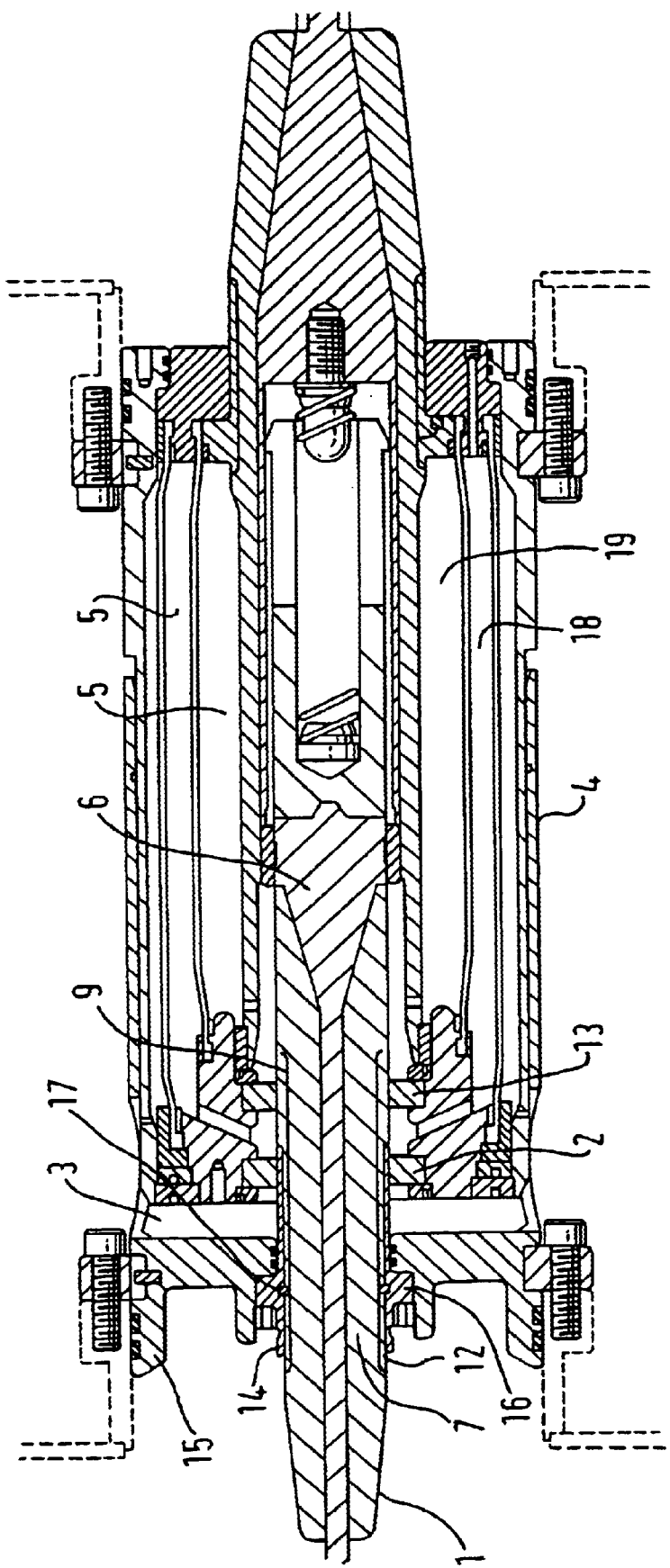

UNDERWATER CONNECTOR WITH ELECTRICAL STRESS REDUCTION

This application claims the benefit of provisional application 60/200,434 filed Apr. 28, 2000.

FIELD OF THE INVENTION

The invention relates to a connector for making an electrical connection underwater or in a wet or conductive environment.

BACKGROUND OF THE INVENTION

An electrical connector capable of being mated and demated underwater is known from GB 2192316. This consists of a first connector part in the form of a plug and a second connector part in the form of a receptacle. To mate the connector, the plug is inserted into the receptacle. The plug houses a set of electrical socket contacts and the receptacle surrounds a corresponding set of electrical connecting pins which, when the connector is mated, engage in the sockets to establish electrical connections. The plug contains dielectric fluid for electrically isolating the various socket contacts from each other. The dielectric fluid is held in a flexible bladder which enables the pressure inside the bladder to balance with respect to external pressure and hence reduce any tendency for contaminants to enter the bladder. The plug, when demated, is sealed closed at the front by a set of shuttle pistons which pass through openings in a corresponding set of seals. When the plug is mated in the receptacle, each electrical connecting pin engages a respective shuttle piston and pushes it back against the force of a spring. The pin passes through the seal opening, in sealing engagement with the seal in place of the pushed back shuttle piston, and makes electrical contact with its corresponding socket contact.

The electrical connecting pins used in such connectors each have a metallic conductive core encapsulated by an insulating material, this insulating material forming the sealing surface of the connecting pin. Thus, when the connector parts are mated the pin insulation passes through and seals against a corresponding seal at the front of the plug. When the connector parts are fully mated the seal is stationary as an interference fit upon the pin insulation. To avoid hydraulic lock of the two connector parts, the receptacle is free flooding thus encompassing the pin contact insulation with ambient water, usually seawater. The seal is under compression, acting as a water tight barrier.

The design described above functions fine until the working voltage of the connector needs to be increased to a value where electrical stress becomes a major concern.

FIG. 1 shows an axial cross-section of a known connecting pin 1 of the type shown in GB 2192316. The pin 1 provided on a receptacle 3 passes through a seal 2 provided at the entrance to a plug connector part 4 containing dielectric fluid 5. The pin 1 has a conductive core 6 encapsulated in insulation 7 which is exposed to ambient seawater 8 in the free flooded receptacle to the left of the seal 2. The conductive core extends forwardly (to the right in the drawing) to where it has a contact portion (not shown), for making electrical contact with a socket contact (not shown) of the plug connector part. The distribution of voltage equipotentials within the insulating materials which are obtained with the connecting pin design of FIG. 1 are shown in the Figure, at 12½% intervals. The equipotentials converge around the front seal 2 of the plug connector part 4. This is due to the earthing effect of the seawater which free floods the receptacle void during connector deployment and mating. As the pin comes into contact with the seal, the equipotentials in the various insulating materials of the plug connector part converge into the pin insulation. This part of the assembly is the region where the highest electrical stresses exist, and is of concern at high voltage, for example voltages in excess of 14 kV. If the stress in this region reaches a level at which degradation of the insulation takes place, the connector will eventually fail.

Moreover, there is not only a high voltage gradient in the material of the seal, there is a high voltage gradient at the interengaging sealing surfaces of the seal and the pin The presence of a high voltage drop along a short distance could be high enough to initiate surface tracking along the interengaging surfaces of the seal and pin, and hence leakage of current to the surrounding water. This problem is amplified by the possible presence of water molecules at the interengaging surfaces, entering during mate/demate cycles. Thus, the inventors have recognised that the location of the converging voltage equipotentials in the material of the seal and the interengaging surfaces of the seal and the pin is problematic.

In addition to the difficulties caused by the location of the converging voltage distribution, the inventors have further recognised that due to the geometry of the assembly, the voltage distribution across the seal is condensed The water acts as an earth and effectively has a pointed profile, as viewed in a axial cross-section, at the interface 11 between the water, seal and pin. The condensed voltage distribution at this interface makes the above problems of potential seal degradation and surface tracking even more acute.

SUMMARY OF THE INVENTION

According to the invention, there is provided a connector for making an electrical connection underwater or in a wet or conductive environment, comprising first and second connector parts for engagement with each other to establish the electrical connection, the first connector part having a connecting pin provided with an insulating layer around a conductive core leading to a first electrical contact portion, the insulating layer being partially screened by a screening conductive layer, the second connector part having a second electrical contact portion for engagement by the first electrical contact portion, and the second connector part having a seal arranged so that in the mated condition of the connector the connecting pin extends forwardly through an opening in the seal, the first electrical contact portion then making contact with the second electrical contact portion, wherein when the connecting pin passes through the seal, the screening conductive layer is arranged to reduce electrical stress at the seal.

By providing the screening conductive layer around the insulating layer it is possible to avoid excessively high electrical stress in the seal and at the interengaging surfaces of the seal and the pin. The risk of the electrical stress in the seal reaching a level approaching the breakdown stress of the seal can be reduced and hence the likelihood of degradation of the seal leading to eventual failure can be reduced. Also, tracking along the interengaging surfaces of the seal and the pin may be avoided.

A reduction of the voltage gradient in the seal and at the interengaging seal and pin surfaces to an acceptable level may be obtained in some embodiments by appropriate design of the geometry of the conductive layer and the insulating layer in the vicinity of the water/seal/pin interface. For example, this geometry can be such as to guide the equipotential field lines evenly into the seal, with no localised condensing of field lines as shown at the interface 11 of FIG. 1.

In such an arrangement, the conductive layer may extend forwardly from outside the seal to terminate, in the mated condition of the connector, at or adjacent the outside of the seal The conductive layer may terminate outwardly of the seal, but preferably the conductive layer is arranged so that in the mated condition of the connector it extends forwardly from outside the seal at least partly into the seal opening. By arranging the conductive layer to extend at least partly into the seal opening, the region where there is a voltage gradient is removed from the critical area at the water/seal/pin interface and is located instead inwardly of the interface.

It is particularly preferred for the conductive layer to be arranged so that in the mated condition of the connector it extends forwardly from outside the seal and into the second connector part, beyond the seal opening The voltage gradient is then even further removed from the water/seal/pin interface and indeed is advantageously removed from the seal altogether. In the location inwardly of the seal the second connector part may be better equipped to insulate the voltage applied, for example by surrounding the connecting pin by a material chosen for its insulating properties rather than sealing properties. This allows the material forming the seal to be selected for its sealing properties rather than electrical insulating properties. The insulating material in the second connector part inwardly of the seal may be solid, e.g. elastomeric, but preferably dielectric fluid is provided. Even if water molecules are present inwardly of the seal, dielectric fluid can allow them to disperse and thus minimise any adverse effects on the functionality of the connector A further advantage of the conductive layer extending forwardly beyond the seal is that the precise point where it terminates when mated, relative to the second connector part, is not critical. It can terminate in a range of positions inwardly of the seal and the tolerances can therefore be relatively relaxed.

It may be desired to provide the second connector part with more than one seal through which the connecting pin extends when the connector is mated. The conductive layer may not extend as far as the second, inner seal, but preferably does so. In a preferred embodiment, therefore, first and second seals are provided such that the connecting pin passes through respective openings in both the seals when the connector is in the mated condition, and wherein the conductive layer is arranged so that in the mated condition it extends at least partly into the second seal opening. The first, outer seal may thus be relatively remote from the region of the voltage gradient in the second connector part and is therefore further protected against degradation caused by electrical stress. Also, the interface between the water, outer seal and pin is remote from the voltage gradient. The first and second seals are preferably axially spaced from each other by a region containing dielectric fluid.

The first seal may define the entrance to an outer chamber, and the second seal the entrance to an inner chamber. Plural chamber arrangements to which the present invention is applicable are described in GB 2192316.

In the embodiments where the conductive layer is arranged to terminate inwardly of the seal, the geometrical shape of the conductive layer is less critical than when it terminates at or adjacent to the seal. This is because, as explained above, the voltage gradient in the second connector part is removed from the seal and from the water/seal/pin interface. Some condensing of the voltage distribution at the termination of the conductive layer is therefore acceptable.

Preferably the front end portion of the conductive layer has an inner surface which curves towards an outer surface thereof. Such a curve can guide the equipotentials into the insulating materials of the second connector part. The use of an appropriate curvature is important if the conducting layer terminates at or adjacent the seal, to avoid convergence of the voltage distribution in this critical area. Such a curvature is preferred even if the conductive layer terminates inwardly of the seal, giving both the advantage of locating the voltage distribution away from the critical water/seal/pin interface, and the advantage of minimising convergence of that distribution.

The profile of the inner surface, as viewed in axial section, may simply have a fixed radius. Alternatively it may have a variable radius. In some preferred embodiments the profile of the inner surface, as viewed in axial section, is defined by an exponential function. One profile which optimises the voltage distribution to achieve low electrical stresses is the Rogowski profile.

The conductive layer may be on the outside of the connecting pin. If the conductive layer extends at least partly into the seal opening, when the connector is mated, it will make physical contact with the seal. In alternative embodiments, a further insulating layer is provided around the conductive layer. The conductive layer is then embedded between inner and outer conductive layers.

The insulating layer or the further insulating layer on the outside of the connecting pin could be allowed to come into contact with the external environment when the first and second connectors parts are in the mated condition. Preferably however a shield is provided on the outside of the connecting pin so as to protect the connecting pin from the external environment when the first and second connector parts are in the mated condition.

This has the advantage of extending the design life of a connector according to the invention as the insulating material of the connecting pin will not come into contact with salt water when used in a subsea environment and so will not be subject to degradation due to the absorption of salt water.

The shield could be made of any suitable material, preferably a corrosion resistant material. Still more preferably, the material of the shield is non-porous. Further, the material is preferably electrically conductive. Thus, in one preferred embodiment, the shield is made of stainless steel.

The shield could just be an annular component which extends around the outer surface of the connecting pin. Preferably however, the shield comprises a portion which extends radially outward therefrom to form a stop for limiting the forward movement of the connecting pin during mating of the first and second connector parts.

The screening conductive layer could be earthed in a number of ways such as for example by being connected to a housing of the first connector part. In one preferred embodiment however, the screening conductive layer is electrically connected to the shield so as to be earthed thereby. This provides a straightforward and effective way of earthing the screening conductive layer.

It will thus be appreciated that the use of an earthing conductive layer in a connector as described herein may alleviate the problems caused by the position of a voltage distribution where the connecting pin enters the second connector part, or the problems caused by the shape of the voltage distribution, or, in the preferred embodiments, both the position and the shape.

The connector may optionally include features which are disclosed in GB 2192316, for example the use of one or more flexible walls to balance the pressure inside the second connector part with external pressure.

BRIEF DESCRIPTION OF THE DRAWINGS

Certain preferred embodiments of the invention will now be described with reference to the accompanying drawings, in which:

FIG. 5 shows an axial cross-section of a connecting pin of a third embodiment;

FIG. 6 shows an axial cross-section of a connecting pin of a fourth embodiment; and FIG. 7 shows an axial cross-section of a connecting pin of a fifth embodiment.

DESCRIPTION OF THE PREFERRED EMBODIMENTS

Figure 2:
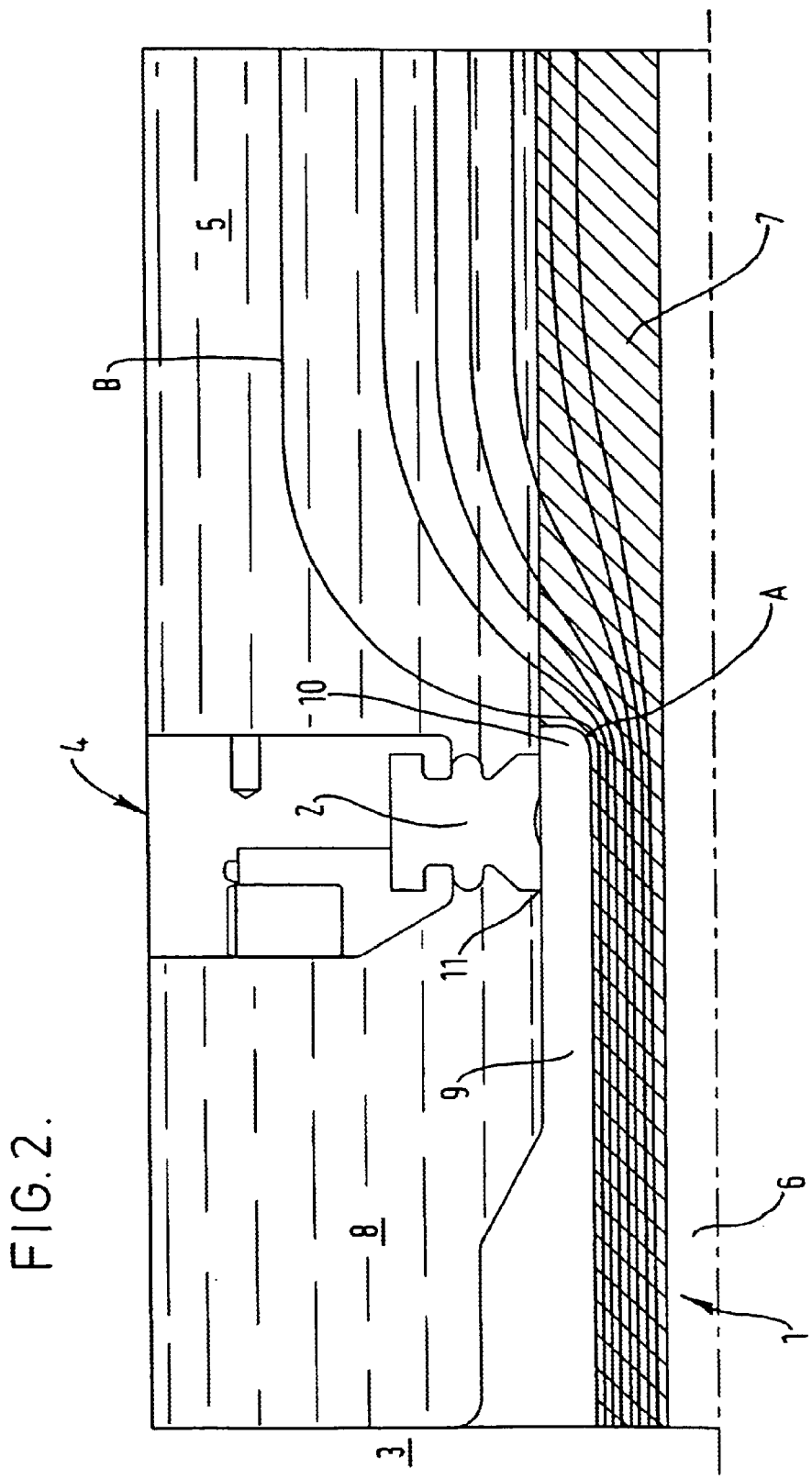
FIG. 2 shows an axial cross-section of a connecting pin of a connector of a first embodiment of the invention.

Referring to FIG. 2, this shows a connecting pin 1 provided on a receptacle 3 passing through a seal 2 provided on a plug connector part 4 containing dielectric fluid 5. The pin 1 has a conductive core 6, an insulating layer 7 around the conductive core and a screening conductive layer 9 around the insulating layer 7. The conductive layer 9 is exposed to ambient water 8 in the free flooded receptacle 3 to the left of the seal 2. The conductive layer 9 terminates at its front end 10 forwardly of the seal 2. The outside surface of the conductive layer 9 therefore seals against the opening at the inside of seal 2. The conductive layer 9 is earthed (at a rearward position not shown in the drawing) by being electrically connected to a housing of the receptacle, which may in turn make earthing contact with an underwater structure or a cable screen, in known manner.

Figure 1:
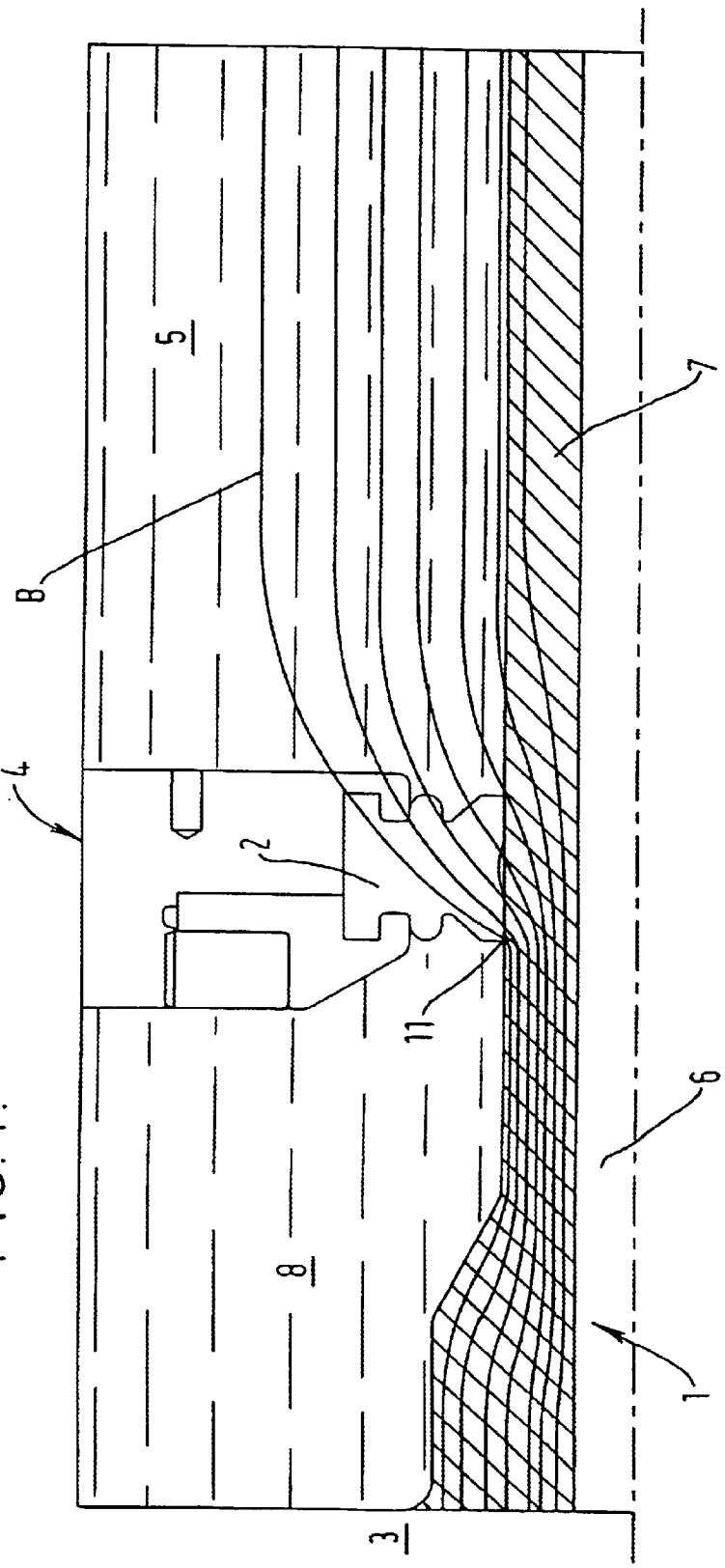
FIG. 1, as mentioned above, shows an axial cross-section of a known connecting pin.

The distribution of equipotentials in the insulation obtained with the connecting pin design shown in FIG. 2 is shown in the Figure. This conductive layer controls the distribution of voltage equipotentials past the seal 2 of the plug connector part to inwardly thereof where the equipotentials diverge into the insulating materials of the socket insert assembly. It will be seen that there is no high stress point at the interface 11 of the water 8, seal 2 and pin 1. The interface 11 is radially separated from the voltage distribution by the thickness of the conductive layer, and axially separated from the voltage distribution by the forward continuation of the conductive layer into the plug connector part. The voltage distribution into the plug insulating materials has now been removed completely from the critical area of the interface 11, as compared to the FIG. 1 arrangement, and is instead located in the heart of the connector where it is more equipped to insulate the voltage applied. This greatly reduces the possibility of tracking as water molecules can be present in this interface with no adverse effects on the functionality of the connector.

In addition to the relocation of the voltage distribution by the conductive layer 9, the shape of the front end of the conductive layer provides the additional benefit of avoiding condensation of the voltage distribution. The internal profile (A) of the conductive layer, as viewed in axial section, is chosen to optimise the distribution of voltage for the lowest electrical stresses possible. The geometry of the profile guides the equipotentials into the insulating materials of the plug connector part evenly, with no convergence of field lines, which would increase localised electrical stresses.

Figure 3:
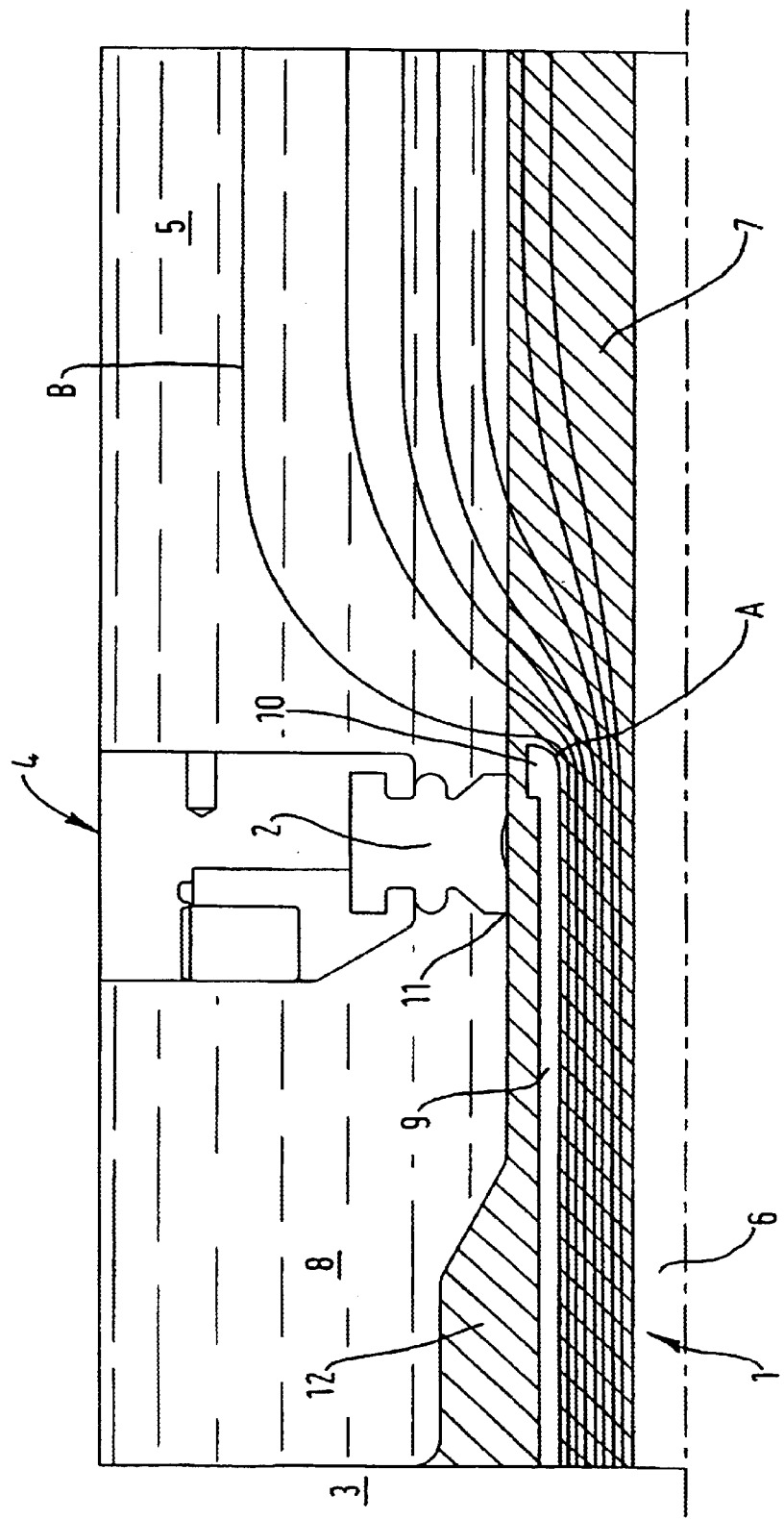
FIG. 3 shows an axial cross-section of a connecting pin of a second embodiment.

FIG. 3 shows a second embodiment and the same reference numerals are used for corresponding parts. The principal difference between the embodiment of FIG. 3 and that of FIG. 2 is that the conductive layer 9 is embedded in the connecting pin insulation. It is therefore disposed around an inner insulating layer 7 and is surrounded by an outer insulating layer 12. The effect of separating the water/seal/pin interface 11 from the voltage distribution, both in the radial direction and in the axial direction, is provided similarly to the embodiment of FIG. 2. In addition, the curved profile at the front end 10 of the conductive layer 9 may be optimised to prevent condensation of the voltage distribution. The outer insulating layer 12 seals against the seal 2.

The profile A of the inner surface of the front end of a conductive layer may be based on the known Rogowski profile. The displacement of a curve (y) may be based upon an exponential function of axial distance (x) such that $y = C + De^x$, where C and D are constants the values of which depend upon the design requirements of the connector.

In one possible example:

$$y = -1 + e^{0.06x}.$$

Figure 4:
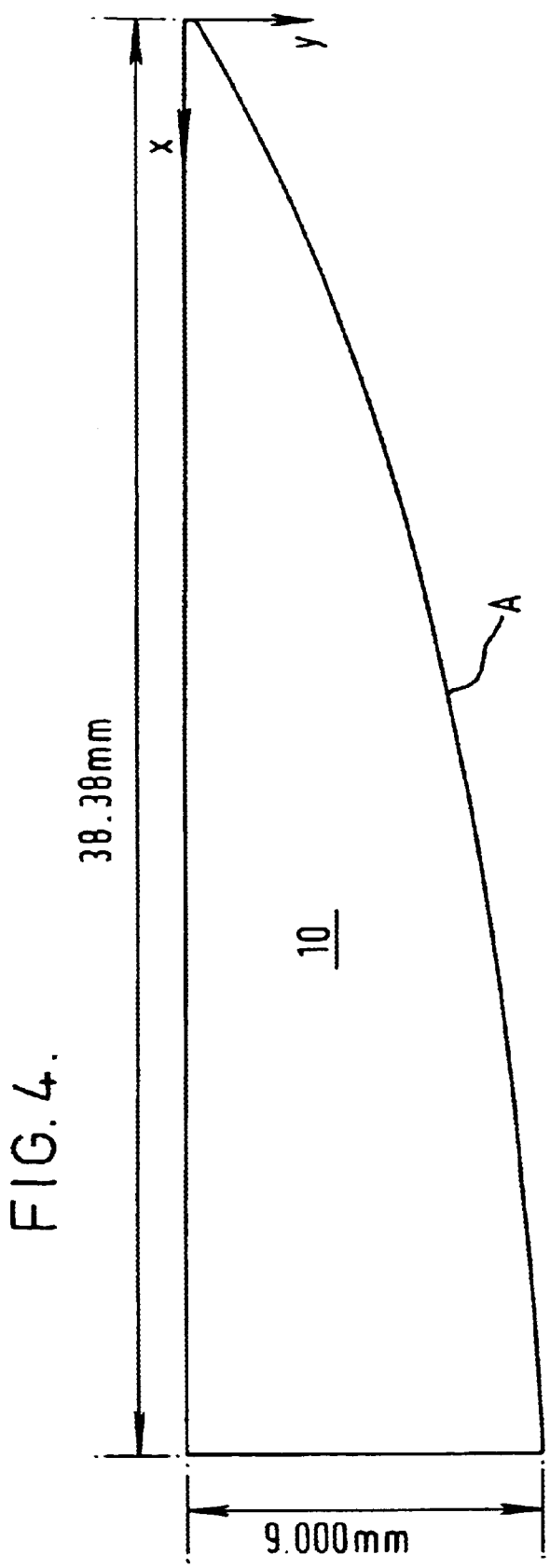
FIG. 4 shows a profile of a front terminal portion of a conductive layer for use in embodiments of the present invention.

The profile using the above function is shown in FIG. 4 and applies to a conductive layer having a thickness of 9 mm which then reduces in the axial direction according to the function. Looking at the profile in 2 mm increments in the X direction, it is as follows:

| x (mm) | 0 | 2 | 4 | 6 | 8 | 10 | 12 | 14 | 16 | 18 |
|---|---|---|---|---|---|---|---|---|---|---|
| y (mm) | 0.000 | 0.127 | 0.271 | 0.433 | 0.616 | 0822 | 1.054 | 1.316 | 1.611 | 1.944 |
| x (mm) | 20 | 22 | 24 | 26 | 28 | 30 | 32 | 34 | 36 | 38 |
| y (mm) | 2.320 | 2743 | 3.220 | 3.758 | 4.365 | 5.049 | 5.820 | 6.690 | 7671 | 8776 |

FIG. 5 shows a third embodiment and the same reference numerals are used for corresponding parts. In this embodiment the conductive layer 9 terminates outwardly of the seal 2, whilst the insulating layer 7 has a radially outwardly protruding portion 7a for guiding the equipotentials evenly into the material of the seal 2.

In the embodiment of FIG. 6, the same reference numerals are again used for corresponding parts. In this embodiment the conductive layer 9 terminates at the outer extremity of the seal 2. The seal 2 has a forwardly projecting lip 2a for guiding the equipotentials smoothly into the material of the seal 2.

FIG. 7 shows a fifth embodiment of a connector according to the invention in which the same reference numerals are used for corresponding parts. As can be seen, the connector is shown in the mated condition. The connector includes a connecting pin 1 having a conductive core 6 having at its front end a first electrical contact portion 6a. The connecting pin 1 is provided on a first connector part including a housing 15 and a receptacle 3 which is freely flooded in use and is located forwardly of the housing. The second connector part (plug connector part 4) is provided with a second electrical contact portion 20 for engagement by the first electrical contact portion 6a when the connector parts are mated, as shown. At this time, the pin 1 passes through a first outer seal 2 and a second inner seal 13 provided on a second connector part (plug connector part 4) and sealing respective outer 18 and inner 19 chambers containing dielectric fluid 5. The pin 1 has a first insulating layer 7 adjacent the conductive core 6, the conductive layer 9 being provided between the first insulating layer 7 and a further outer insulating layer 12 as in the embodiment of FIG. 3. The conductive layer 9 is arranged to extend forwardly of the second seal 13 when the first and second connector parts are in the mated condition.

The distribution of equipotentials in the insulation obtained with the connecting pin of the FIG. 7 embodiment is not shown. It will be appreciated however that the equipotential distribution will be substantially the same as that shown in FIG. 3.

The connector of the FIG. 7 embodiment additionally includes a metallic shield 14 made of conductive, non-porous, corrosion resistant material (such as for example 316 stainless steel). This shield 14 surrounds the outer surface of the outer insulating layer 12 on the pin 1. The shield is made up of a substantially cylindrical body which surrounds the outer insulating layer and extends from a point which is located inwardly of the first outer seal 2 when the connector parts are mated to a point which is located within the housing 15 when the connector parts are mated. A radially outwardly protruding annular part 16 is provided on the shield 14 which is arranged to abut against the inner or rearward surface of the housing 15 when the connector parts are fully mated so as to limit the movement of the pin 1 into the socket connector part 4.

A copper ring 17 is provided in the shield 14 at the level of the annular part 16. The copper ring 17 is electrically connected to the conductive layer 9 thus providing a connection to earth for the conductive layer.

It will be appreciated that when the first and second connector parts are in the fully mated condition as shown in FIG. 7, the only part of the pin 1 which is exposed to seawater 8 is the part in the free flooded receptacle 3 (this is the part which is located between the receptacle housing 15 and the first outer seal 2). The part of the pin 1 located in the receptacle 3 when the connector parts are in the fully mated condition is covered by the shield and so the pin is protected from the seawater by the shield 14. Thus the inner and outer insulating material layers 7 and 12 are protected by the shield from the damaging effects of seawater during use. Consequently, the shield further increases the design life of the connector.

The connector designs described herein will increase the design life at a given voltage as compared to known connector designs They may also be used for higher voltages than previously applied to underwater or wet or conductive environment connectors. Voltages in excess of 14 kV may be used, or even 36 kv or more.

It will be appreciated that the invention is not limited to the features of the preferred embodiments described above and modifications could be made to the embodiments within the scope of the invention. For example, the connecting pin and the seal through which is passes are described as belonging respectively to a receptacle and a plug connector part, but the reverse arrangement of the pin being provided on a plug and the seal on a receptacle is also possible Indeed, there are many possible configurations of connector parts for supporting or housing the pin and the seal.

It should also be understood that although the connector of the invention is primarily intended for making a connection in an underwater or wet or conductive environment, it may also be used in a dry or insulating environment.

What is claimed is:

1. A connector for making a high voltage electrical connection underwater or in a wet or conductive environment, the connector comprising first and second connector parts for engagement with each other to establish the electrical connection, the first connector part having a connecting pin with an outer surface and provided with an insulating layer around a conductive core leading in a forward direction to a first electrical contact portion, a length of the insulating layer being disposed within and screened by a screening conductive layer, the screening conductive layer being immovably positioned relative to the insulating layer, the second connector part having a second electrical contact portion for engagement by the first electrical contact portion, and the second connector part having a seal arranged so that in the mated condition of the connector the connecting pin extends forwardly through an opening in the seal, the first electrical contact portion then making contact with the second electrical contact portion, wherein when the connecting pin passes through the seal, the screening conductive layer is arranged to avoid or reduce electrical stress at the seal by avoiding or reducing localized condensing of equipotential field lines in the seal, and wherein the screening conductive layer has a front end portion having an inner surface, the inner surface of the front end portion being curved in the forward direction towards the outer surface of the connecting pin.

2. A connector as claimed in claim 1, wherein the conductive layer is arranged so that in the mated condition of the connector it extends forwardly from outside the seal at least partly into the seal opening.

3. A connector as claimed in claim 1, wherein the conductive layer is arranged so that in the mated condition of the connector it extends forwardly from outside the seal and into the second connector, beyond the seal opening.

4. A connector as claimed in claim 1, wherein first and second seals are provided such that the connecting pin passes through respective openings in both the seals when the connector is in the mated condition, and wherein the conductive layer is arranged so that in the mated condition it extends at least partly into the second seal opening.

5. A connector as claimed in claim 1, wherein the profile of the inner surface of the front end portion of the conductive layer, as viewed in axial section, is defined by an exponential function.

6. A connector as claimed in claim 1, wherein the profile of the inner surface of the front end portion of the conductive layer, as viewed in axial section, is the Rogowski profile.

7. A connector as claimed in claim 1, wherein the profile of the inner surface of the front end portion of the conductive layer, as viewed in axial section, has a constant or variable radius of curvature.

8. A connector as claimed in claim 1, wherein the conductive layer is on the outside of the connecting pin.

9. A connector as claimed in claim 1, wherein a further insulating layer is provided around the conductive layer.

10. A connector as claimed in claim 1, wherein dielectric fluid is provided inwardly of the seal.

11. A connector as claimed in claim 1, further comprising a shield provided on the outside of the connecting pin so as to protect the connecting pin from the external environment when the first and second connector parts are in the mated condition.

12. A connector as claimed in claim 11, wherein the shield is made of corrosion resistant material.

13. A connector as claimed in claim 11, wherein the shield is made of non-porous material.

14. A connector as claimed in claim 11, wherein the shield is made of electrically conductive material.

15. A connector as claimed in claim 11, wherein the shield comprises a portion which extends radially outwardly therefrom to form a stop for limiting the forward movement of the connecting pin during mating of the first and second connector parts.

16. A connector as claimed in claim 11, wherein the shield is electrically connected to the screening conductive layer so as to connect the screening conductive layer to earth.

17. A connector for making a high voltage electrical connection underwater or in a wet or conductive environment, the connector comprising a first connector part and a second connector part, the first and second connector parts being adapted for engagement with each other to establish the electrical connection, the first connector part having a connecting pin with an outer surface and provided with an insulating layer around a conductive core leading in a forward direction to a first electrical contact portion, a length of the insulating layer being disposed within and screened by a screening conductive layer which has a front end portion, an inner surface of the front end portion curving in the forward direction towards the outer surface of the connecting pin, and a further insulating layer being provided around the conductive layer, the screening conductive layer being immovably positioned relative to the insulating layer, the second connector part having a second electrical contact portion for engagement by the first electrical contact portion, and the second connector part having a first seal and a second seal arranged so that in the mated condition of the connector the connecting pin extends forwardly through respective openings in both the first and second seals, the first electrical contact portion then making contact with the second electrical contact portion, wherein when the connecting pin passes through the seals, the screening conductive layer is arranged to avoid or reduce electrical stress at the seals by avoiding or reducing localized condensing of equipotential field lines in the seals, and wherein the conductive layer is arranged so that in the mated condition it extends at least partly into the second seal opening, the connector further comprising a corrosion resistant shield, provided on the outside of the connecting pin so as to protect the connecting pin from the external environment when the first and second connector parts are in the mated condition.

18. A connector as claimed in claim 17, wherein the shield comprises a portion which extends radially outwardly therefrom to form a stop for limiting the forward movement of the connecting pin during mating of the first and second connector parts.

19. A connector as claimed in claim 17, wherein the shield is electrically connected to the screening conductive layer so as to connect the screening conductive layer to earth.

20. A connector for making a high voltage electrical connection underwater or in a wet or conductive environment, the connector comprising first and second connector parts for engagement with each other to establish the electrical connection, the first connector part having a connecting pin provided with an insulating layer around a conductive core leading to a first electrical contact portion, a length of the insulating layer being disposed within and screened by a screening conductive layer, the screening conductive layer being immovably positioned relative to the insulating layer, the second connector part having a second electrical contact portion for engagement by the first electrical contact portion, and the second connector part having a seal arranged so that in the mated condition of the connector the connecting pin extends forwardly through an opening in the seal, the first electrical contact portion then making contact with the second electrical contact portion, wherein when the connecting pin passes through the seal, the screening conductive layer is arranged to avoid or reduce electrical stress at the seal by avoiding or reducing localized condensing of equipotential field lines in the seal, and wherein the connector comprises an electrically conductive shield provided on the outside of the connecting pin and extending forwardly along the connecting pin so that in the mated condition of the connector the electrically conductive shield extends into the opening in the seal in contact therewith.

21. A connector as claimed in claim 20, wherein the electrically conductive shield is also the screening conductive layer.

22. A connector as claimed in claim 20, wherein the screening conductive layer is radially inwardly spaced from the electrically conductive shield and is electrically connected thereto.

* * * * *